Oct. 8, 1957 F. H. STORCK ET AL 2,809,269
MACHINE FOR WELDING METAL O-RINGS
Filed April 18, 1955 5 Sheets-Sheet 2
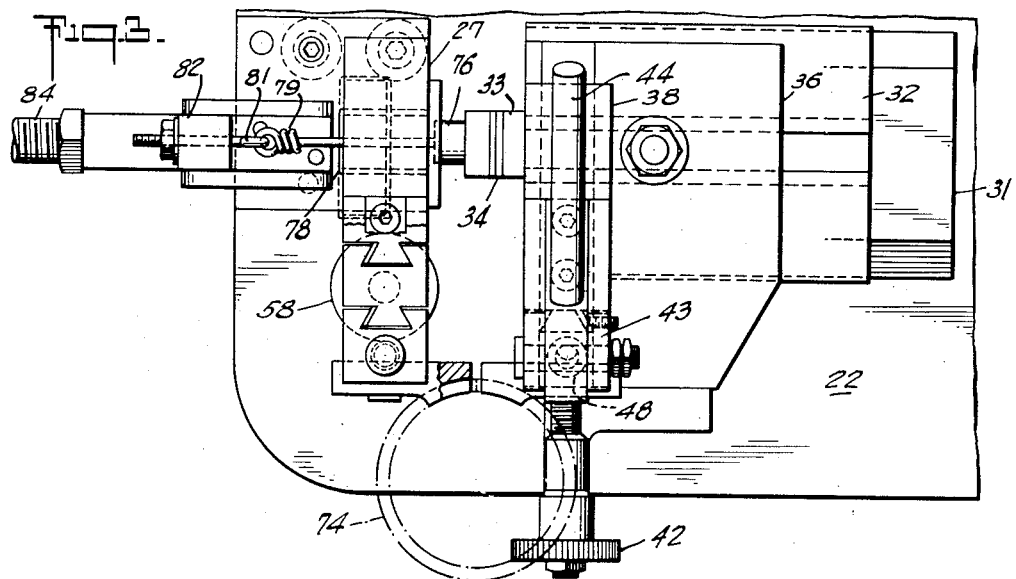
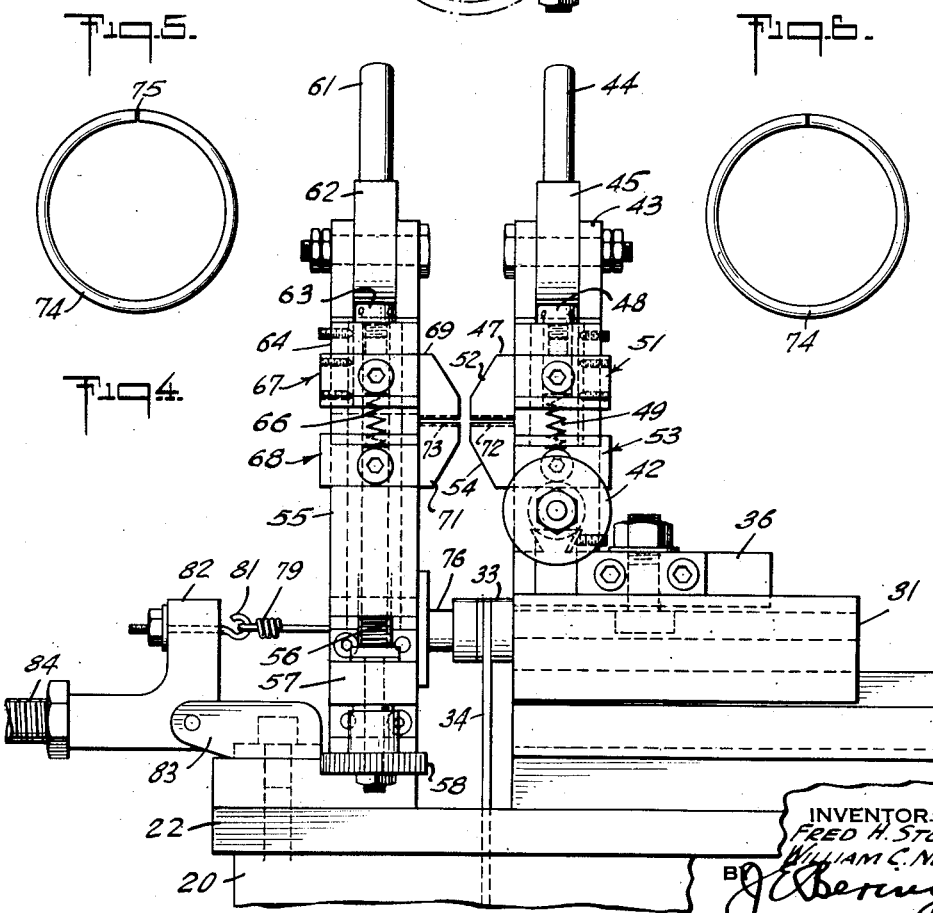
INVENTORS:
FRED H. STORCK
WILLIAM C. NUCKLES
BY
their ATTORNEY

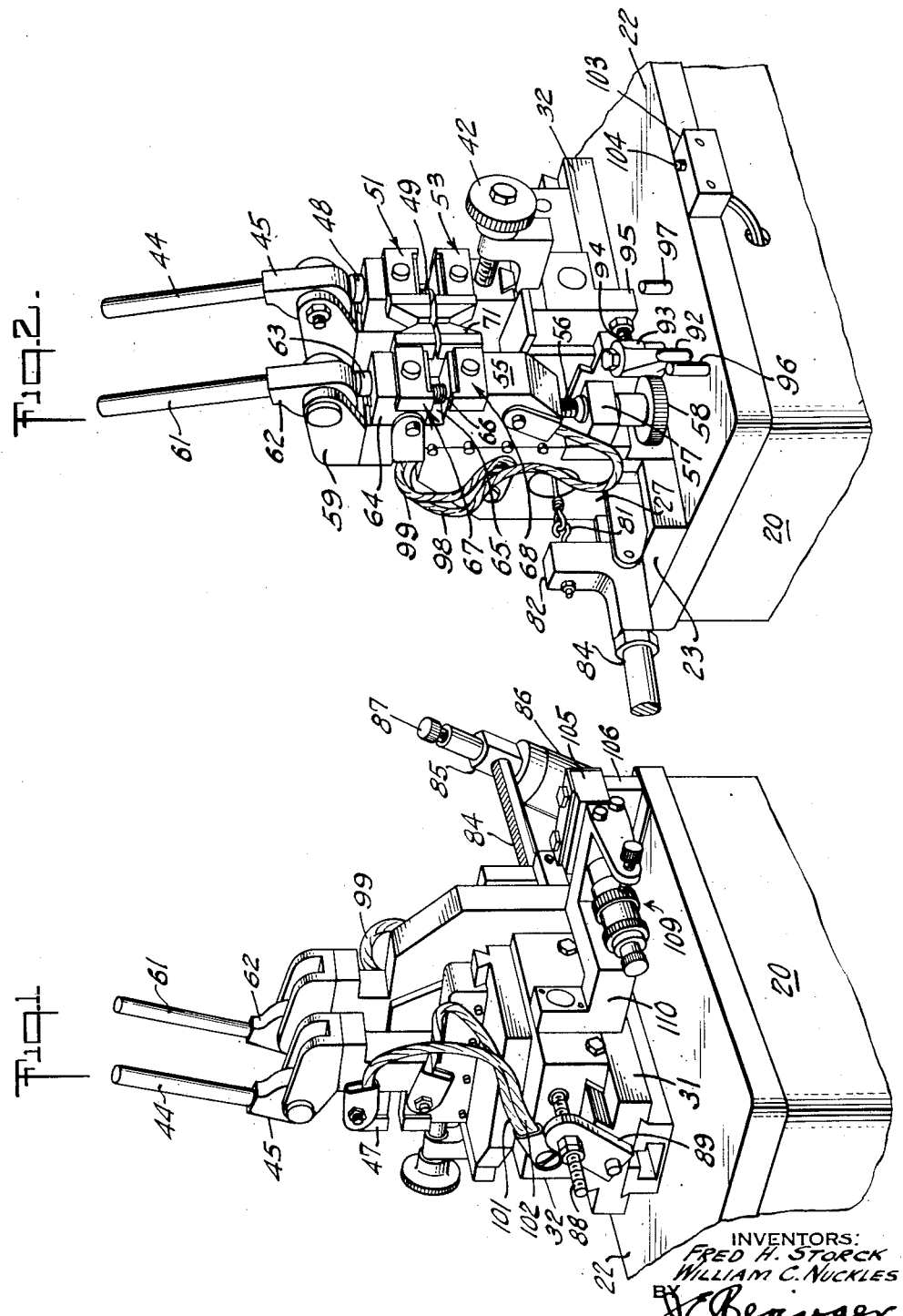

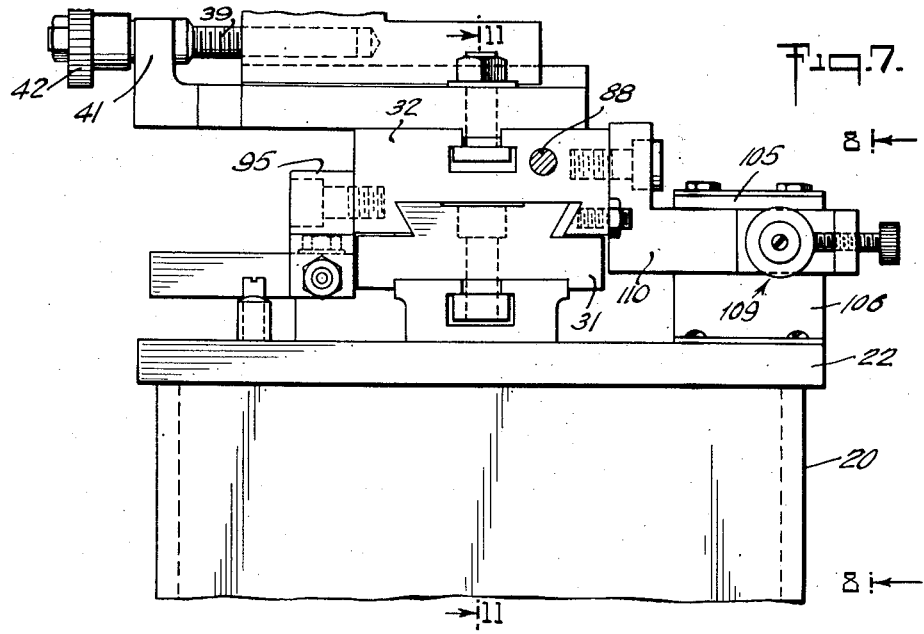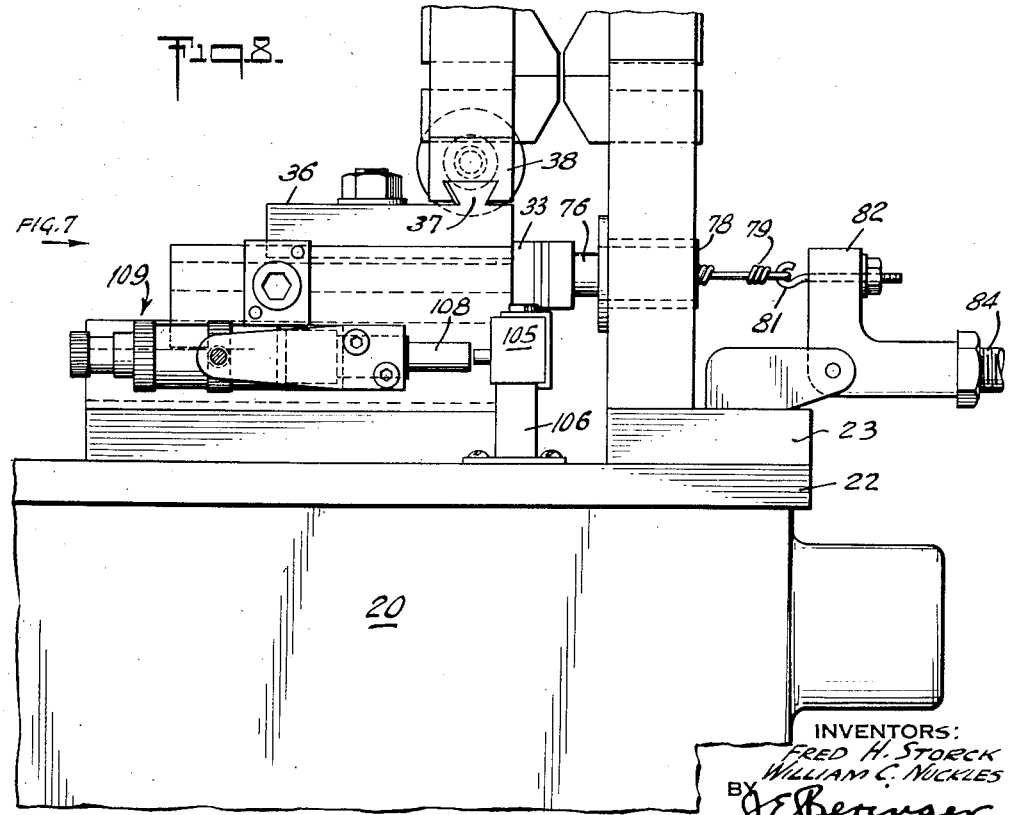

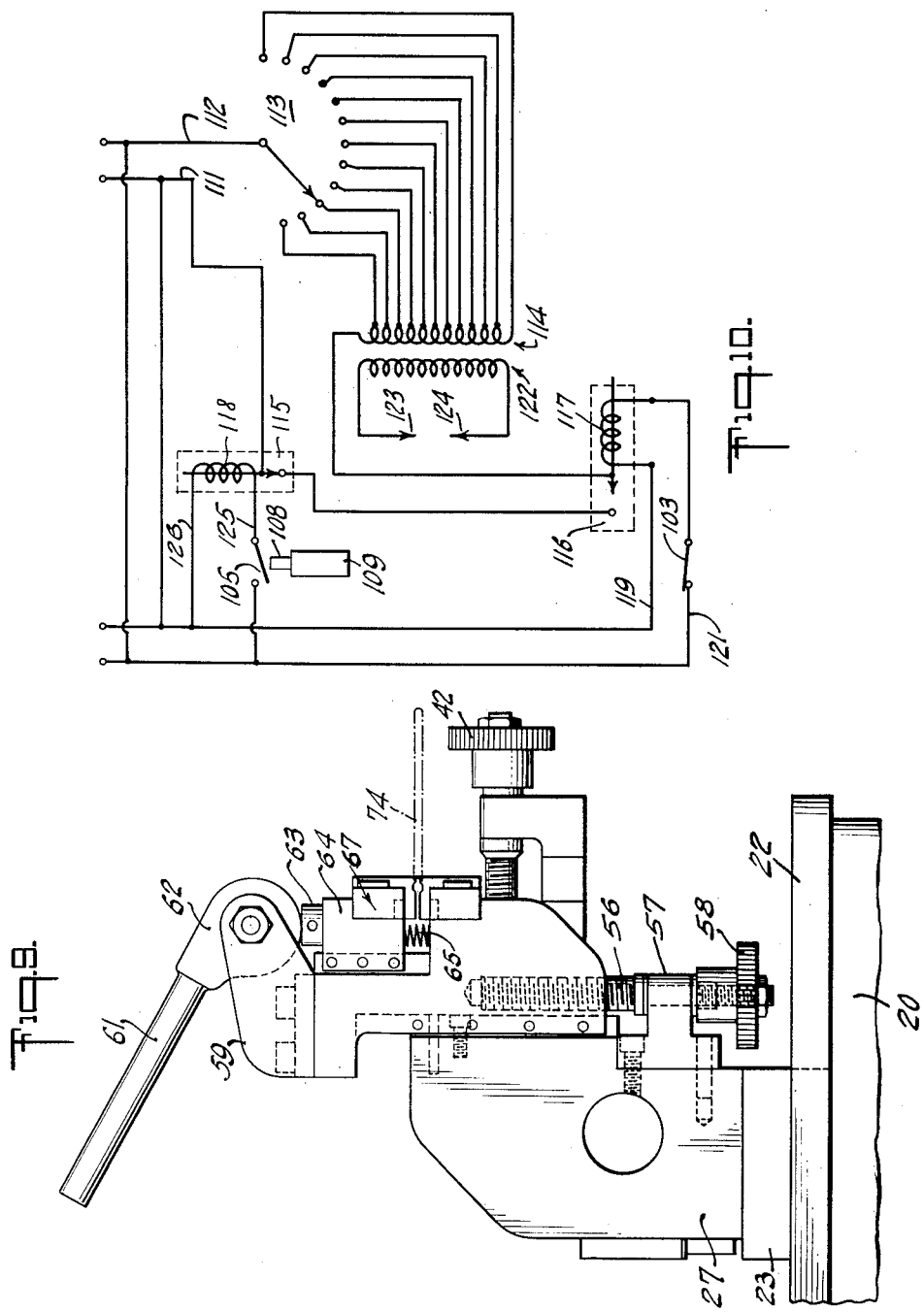

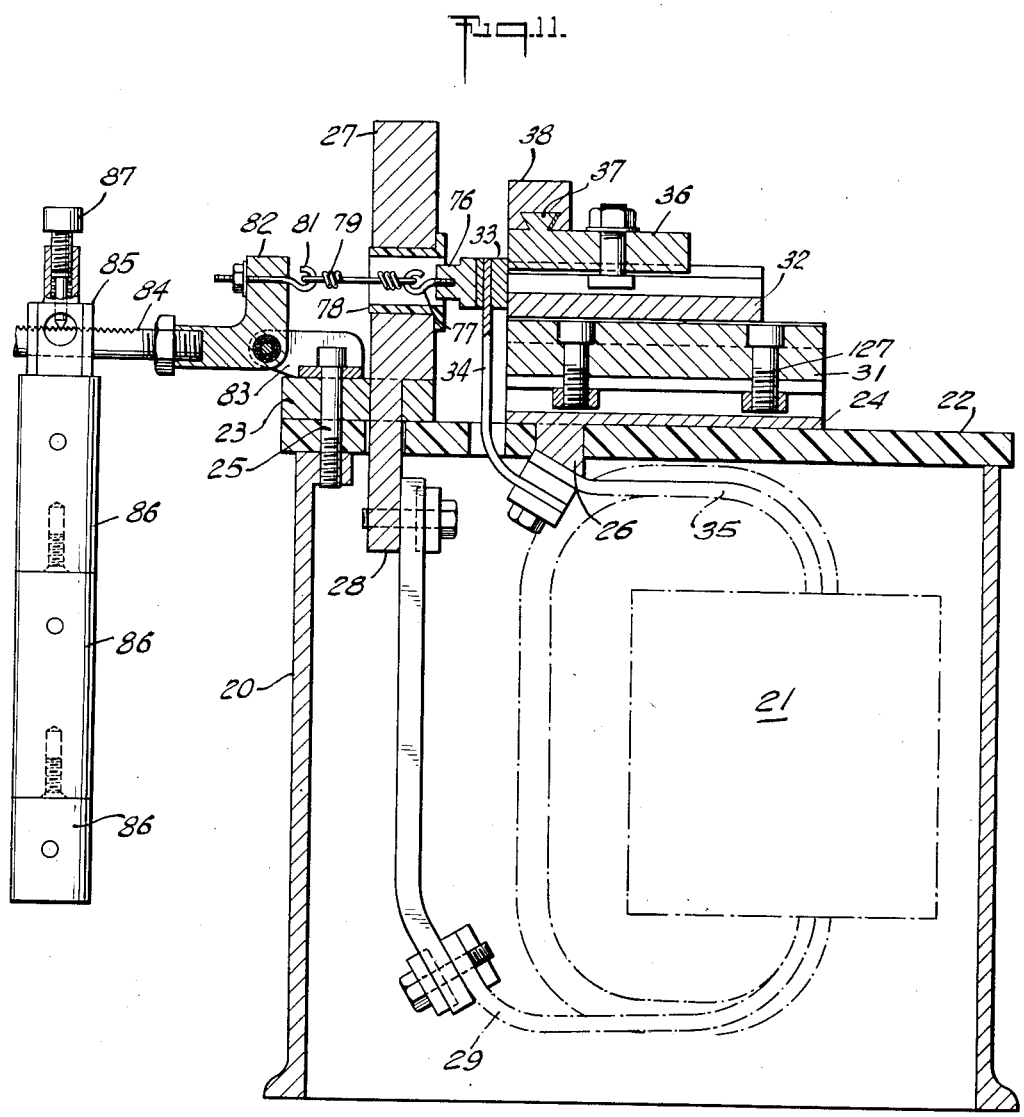

2,809,269

MACHINE FOR WELDING METAL O-RINGS

Fred H. Storck, Dayton, and William Carson Nuckles, Springfield, Ohio, assignors to United Aircraft Products, Inc., Dayton, Ohio, a corporation of Ohio Application April 18, 1955, Serial No. 501,816

3 Claims. (Cl. 219—51)

This invention relates to welding equipment, and particularly to a welding machine adapted for use in the manufacture of hollow metal O-rings.

In the manufacture of such rings straight metal tubing is cut and formed to the desired shape, which may be circular or non-circular, and the free ends are joined together by welding to make a unitary hollow ring useful in various kinds of machinery and in piping as a seal inhibiting the escape of fluid under pressure. The material of the O-ring is quite thin, requiring a high degree of accuracy in butting the free ends together for welding, and it is also desirable that the welding machine be adaptable for work on rings of varying diameter and thickness. It further is important that the finished ring conform accurately to a determined dimension and that successively made rings in a production run all be of the same uniform diameter. Hence, the degree of upsetting of material on the ends of the ring, which is a necessary part of the welding operation must be closely controlled so that it too is uniform with successive rings.

It is thought that with the instant invention, there is presented a welding machine accomplishing all of the above objectives in a better and more facile manner than has been known theretofore, and which at the same time is relatively simple of construction and operation. To make possible a machine so characterized is a principal object of the invention. It is, for example, a feature of the machine in its illustrative form that it is adaptable for welding rings varying in size from a fraction of an inch to several feet in diameter.

In the drawings,

Fig. 1 is a view in perspective of the illustrative embodiment of the welding machine of this invention, looking generally at the rear of the machine;

Fig. 2 is a view similar to Fig. 1, looking generally at the front of the machine;

Fig. 3 is a top plan view of the machine;

Fig. 4 is a fragmentary view in front elevation;

Fig. 5 is a view of an O-ring prior to welding;

Fig. 6 is a view of the ring after welding;

Fig. 7 is a fragmentary view in right-hand end elevation, looking in the direction of the arrow of Fig. 8;

Fig. 8 is a view in rear elevation, looking in the direction of the arrows of Fig. 7;

Fig. 9 is a view in left-hand side elevation;

Fig. 10 is a diagram of the electrical system, including its controls; and

Fig. 11 is a view in cross section, taken substantially along the line 11—11 of Fig. 7.

Referring to the drawings, in its illustrative form, the welding machine comprises a pedestal or base 20 housing a transformer 21 and some of the electrical wiring. On top of the base 20 is a plate 22 made of a non-conductive material and serving as an insulator and as a table for support of overlying machine elements.

Stationarily mounted on the table 22 are spaced apart plates 23 and 24, made fast by a bolt 25 in the case of plate 23 and by a tongue 26 received in the table 22 in the case of plate 24. Stationarily mounted on the plate 23 is a vertical wall member 27, held against movement by a tongue 28 thereon extending downward through aligned openings in the plate 23 and table 22. Within the pedestal 20, the projection 28 is electrically connected by means including a lead 29 to the secondary of the transformer 21.

The plate 24 mounts a slideway 31, the construction and arrangement of parts providing for a longitudinal adjustment of the slideway as may be necessary or desirable. Mounted for relative longitudinal motion on the slideway 31 is a slide 32 on the front or left-hand end of which is a bar 33 connected by means including a conductor 34 and a cable 35 with the secondary of the transformer 21. To the slide 32 is adjustably secured a carrier plate 36 formed with a key 37 extending transversely of the slide 31 but in a forwardly and rearwardly direction with respect to the front of the machine. An electrode supporting member 38 is slidably mounted on the key 37 but is normally held stationary thereon by a screw stud 39 having a rotary bearing in a right angle portion 41 of the carrier plate 36. The stud 39 has a handle 42 presented at the front of the machine for operator controlled adjustments of the supporting member 38 longitudinally of the key 37.

Stationarily mounted on top of the support 38 is a U-shaped bracket 43 within which is pivotally mounted a lever 44 having on its lower end a cam face 45. The front edge of the support member 38 is formed to provide a cut-out portion 46 and slidably mounts a block 47 therein. The latter on its upper end presents a projection 48 urged to contacting relation with the cam surface 45 on the lever 44 by means of a compression spring 49 seated on the bottom of the cut-out portion 46. The block 47 in turn mounts a die element 51 having a laterally projecting jaw portion 52. A companion die element 53 is mounted on the front of support member 38 beneath the cut-out portion 46 and has a jaw portion 54 presented in underlying opposing relation to the jaw 52. The spring 49, it will be understood, tends to maintain a gap between the jaws 52 and 54 which may, however, be closed or partly closed by an appropriate swinging motion of the lever 44, motion of such lever in the opposite direction releasing the jaws again to the influence of the spring 49 which tends to effect a separating motion thereof.

Slidably mounted on the front edge of the aforementioned wall member 27 is an electrode carrier 55 adjustable in a vertical sense by a screw stud 56 entering the bottom of carrier 55 and rotatably mounted in a bearing member 57 secured to the wall member 27. A knob or handle 58 on the lower end of the stud 56 is provided for operator adjustment of the carrier 55. On top of the carrier 55 is a U-shaped bracket 59 like the bracket 43 and pivotally mounting a lever 61 having a cam surface 62. Acting through a projection 63, the lever 61 is effective to control the movements of a block member 64 slidably mounted on the front of the carrier 55 in a cut-out portion 65 thereof. A compression spring 66 is seated on the bottom of cut-out portion 65 and urges the block 64 upward, maintaining the projection 63 thereon in contact with the cam surface 62. Die elements 67 and 68 are mounted respectively on the block 64 and on the front of the carrier 55 beneath the cut-out portion 65. The dies have laterally projecting jaw portions 69 and 71 in opposing relation to one another and in oppositely facing adjacent relation to the die jaws 52 and 54.

The set of jaws 52 and 54 present respectively opposing and parallel planar surfaces within which are formed mating grooves 72. Similar grooves 73 are formed in the set of jaws 69 and 71. The grooves 72 and 73 are arcuate in shape and complement one another in defining a segment of a circle corresponding to a segment of a ring to be welded. Thus, when the levers 44 and 61 are adjusted to open the sets of clamping jaws a ring, such as the ring 74 shown in Figs. 5 and 9, is held in the manner indicated in Fig. 9 with a part of the body thereof received in the grooves 72 and 73 of the lower sets of jaws 54 and 71. The levers 44 and 61 then are readjusted to move the upper jaws 52 and 69 downward, in the course of which movement they encounter the interposed ring 74 and cooperate with the lower jaws 54 and 71 in applying a clamping pressure thereto. The ring 74 is positioned, it will be understood, with a split portion 75 occupying the space between the sets of jaws 52 and 54 and 69 and 71.

Pressure is applied to the joint 75 of a held ring through a biasing of the slide 32 and the parts carried thereby in a leftward direction as viewed in Fig. 4. The previously mentioned bar 33 on the front of the slide 32 has an anchor member 76 attached thereto, such member being made of an insulating material and mounting a hook 77 (Fig. 11). The hook 77 extends into an opening 78 in the wall member 27 and has attached thereto one end of a relatively unyielding tie member 79, the other end of which is attached to a hook 81 set in one arm of a bell crank lever 82 pivotally mounted on a bracket 83 fast on stationary plate 23. The other arm of the lever 82 mounts an axially extending screw shaft 84 on which is a hanger member 85 supporting weights 86. The hanger member 85 is selectively positionable along the shaft 84 and is held in selected positions by a lock screw 87 engageable with serrations in the shaft 84. The weights 86 overbalance the lever 82 in a counterclockwise direction, exerting through the connector 79 a pulling motion upon the slide 32 toward the wall member 27. Motion of the slide 32 in this direction positively is limited by a screw stud 88 extending outwardly or to the right therefrom and passing through an arm 89 made fast on the end of the stationary slideway 31. Nuts 91 on the screw stud 88 are engageable with the arm 89 to limit an approaching motion of the slide 32 toward the wall member 27 and it will be understood that the nuts 91 are adjustable for a fine control of the movements of the slide 32. Since the carrier support member 38 and die elements 51 and 53 are carried by the slide 32 it will be understood that a biasing motion of the slide under the influence of the weights 86 is effective to apply pressure to the joint 75 of a ring 74 when held clamped between the sets of jaws 52—54 and 69—71 as before described. The applied pressure is released through a lever 92 pivotally mounted on the table 22 at the front of the machine and having a cam surface 93 engaging a stud 94 set in a downwardly projecting part 95 attached to or formed integrally with the carrier member 38. Motion of the lever 92 between opposing limit studs 96 and 97, it will be understood, is effective positively to move the slide 32 and parts carried thereby in one direction against the urging of weights 86 and is effective also to control motion of the slide 32 and associated parts in the opposite direction.

Both the wall member 27 and the slide 32 are as before noted connected to the secondary of the transformer 21. The wall member 27 in turn is directly connected by cables 98 and 99 to the carrier member 55 and block 64 and the supported die members 67 and 68 are thereby energized for application of welding current to the held ring. Similarly, the slide 32 is connected by cables 101 and 102 to the carrier member 38 and to the block 47 with the result that the die elements 51 and 53 also are energized upon the energizing of the secondary of the transformer.

Application of the welding current is under control of a microswitch 103 at the front of the machine having a finger depressible push button 104. A similar switch 105 is mounted on a bar 106 on the table 22 at the rear of the machine. The switch 105 has a depressible push button 107 engageable by the stem 108 of a micrometer 109 installed in a bracket 110 fixed to the rear of the slide 32. The switch 105, according to the construction and arrangement of parts, is actuated by the micrometer 109 after a predetermined extent of motion of the slide 32 under the influence of weights 86 to discontinue application of the welding current.

The electrical circuit also includes relay means controlled by the described switches. As indicated in the diagram of Fig. 10, power lines 111 and 112 enter the machine, the latter being connected through a voltage selector switch 113 to the primary windings 114 of the transformer. The power line 111 also is connected to the primary windings 114 of the transformer through a normally closed relay switch 115 and a normally open relay switch 116, the latter thus normally maintaining an open circuit through the primary 114. The switch 116 includes an electromagnetic coil winding 117 which when energized acts to close the switch 116. The relay switch 115 includes a similar winding 118 which when energized serves to open the switch 115. The coil 117 is connected by leads 119 and 121 to the power lines 111 and 112, and in one of such leads is interposed the starting switch 103. Closing of the switch 103, which is normally open, closes a circuit through the coil 117, which in turn closes the relay switch 116 and energizes primary windings 114 of the transformer. Secondary coils 122 of the transformer thereby are energized whereby to supply current to the clamping die elements of the machine, here diagrammatically indicated as electrodes 123 and 124. The application of the welding current automatically is discontinued by the micrometer 109, the stem 108 of which actuates and closes microswitch 105. This switch, normally open, is interposed in a lead 125 which together with a lead 126 connect the electromagnetic coil 118 across the power lines 111 and 112. Closing of the switch 105 accordingly results in energizing of the coil 118 and opening of the relay switch 115 with a consequent opening of the circuit through primary windings 114 and interruption in application of the welding current.

In the use of the machine, a ring 74 is placed between the jaws 52—54 and 69—71 in the manner indicated in Fig. 9. Prior to installation of the ring the levers 44 and 61 are adjusted to open the clamping jaws and the lever 92 is adjusted to move the slide 32 and supported parts in a right hand direction against the urging of the weights 86. After the ring has been placed in the groves 72 and 73 of the lower jaws 54 and 71, the levers 44 and 61 are moved to cause the upper jaws 52 and 69 to descend upon and clamp the ring in place. The lever 92 then is adjusted to return the slide 32 to the influence of the weights 86 which thus apply a biasing pressure to the slide 32 resisted by engagement of the free ends of the ring 74 at the joint 75. Finally, the starting button 104 on the electric switch 103 is depressed and heat is so applied to the ring 74, the combination of applied heat and pressure resulting in formation of a weld at the joint 75. The application of heat automatically is discontinued, as before noted, by actuation of the switch 105 and when this occurs, the operator disengages the upper clamping jaws 52 and 69 by movement of the levers 44 and 61, and releases lever 92. The completed ring then may be removed from the machine and has the appearance substantially as indicated in Fig. 6, after removal of burrs.

The machine lends itself to a variety of adjustments for insuring uniformly accurate work and for adaptation to the welding of rings of different thickness and diameter. In the latter regard, the die elements 51 and 53 and 67 and 68 are readily replaceable and there may be kept on hand a variety of combinations of such die elements having differently formed grooves 72 and 73. The initial position of one set of clamping jaws relatively to the other may be varied through adjustment bolts 127 by which the slide 31 is mounted on the stationary plate 24. The control knobs 42 and 58 at the front of the machine provide a means of obtaining an accurately aligned co-planar relationship of the upper surfaces of the lower jaws 54 and 71 and the grooves 72 and 73 therein, thus assuring a square or accurate abutment of the free ends of the ring 74 at the joint 75. The screw stud 88 and plate 89 positively limit advance of the slide 32 and this limiting device along with the micrometer 109 are susceptible of fine adjustments for accurate determination of the limits of applied pressure and of applied heat. The amount of applied pressure is a function of the kind and number of weights 86 utilized and it will further be understood that the hanger 85 is adapted for the mounting of different sizes and numbers of weights thereon.

What is claimed is:

1. A machine for welding split metal O-rings, including a base presenting an approximately planner table surface, supports on said table surface, one of said supports being movable in approaching and separating motions relatively to the other, dies on each of said supports, said dies being disposed in side by side adjacent relation and having co-planar upper surfaces in approximately parallel relation to said planar table surface, an arcuate groove in each of said die surfaces complementing the groove in the other die surface to define a segment of a circle corresponding to a circumferential segment of a ring of predetermined diameter, the ring being placed in said grooves with the split portion lying between said dies and the body thereof in a plane approximately parallel to said planar table surface, jaws arranged to descend on said dies and grip said ring, an approaching motion of said one support placing said split portion under pressure, and means for applying heat to said split portion.

2. A machine for welding split metal O-rings, including a base presenting an approximately planar table surface, supports on said table surface, one of said supports being movable in approaching and separating motions relatively to the other, a die on each of said supports, said dies being in companion, side by side relation and presenting co-planar top surfaces in approximately parallel relation to said planar table surface, curved grooves in said surfaces complementing one another to define a segment of a circle corresponding to a segment of a ring of predetermined thickness and diameter, a ring to be welded being placed in said grooves with the split portion located between said dies and the body thereof in a plane approximately parallel to said planar table surface, clamping jaws arranged to descend on said dies and grip said ring, manipulative means controlling approaching motion of said support to apply pressure to said split portion and moving said one support in a separating motion, other manipulative means for opening and closing said clamping jaws on said dies, and still other means for applying heat to said split portion.

3. A machine according to claim 2, characterized in that said last named means includes an electrical control circuit comprising a first normally open switch closed by hand to apply heat to said split portion and a second normally open switch closed by motion of said one support of predetermined extent for discontinuing the application of heat to said split portion.

References Cited in the file of this patent

UNITED STATES PATENTS

| | | |
|---|---|---|
| 537,012 | Burton et al. | Apr. 9, 1895 |
| 924,868 | Winfield et al. | June 15, 1909 |
| 1,048,884 | Rietzel | Dec. 31, 1912 |
| 2,018,379 | Pfeiffer | Oct. 22, 1935 |